(12) United States Patent
Selli et al.

(10) Patent No.: US 6,433,791 B2
(45) Date of Patent: *Aug. 13, 2002

(54) DISPLACEABLE DISPLAY ARRANGEMENT

(75) Inventors: Basilio Selli, Nesconset, NY (US); Gilmar M. Caldeira, Sertaozinho (BR)

(73) Assignee: Smar Research Corporation, Holbrook, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,258

(22) Filed: Aug. 10, 1999

(51) Int. Cl.[7] ................................................. G09G 5/34
(52) U.S. Cl. ........................ 345/659; 345/205; 345/214; 361/681
(58) Field of Search ................................ 345/121, 126, 345/168, 169, 173, 139, 204, 563, 659, 537, 205, 214, 649; 361/680–683

(56) References Cited

U.S. PATENT DOCUMENTS

| | | | |
|---|---|---|---|
| 4,384,790 A | | 5/1983 | Nakazawa |
| 4,629,289 A | | 12/1986 | Streit |
| 4,763,291 A | * | 8/1988 | Schwaber .................... 708/104 |
| 4,823,080 A | | 4/1989 | Lin |
| 5,134,390 A | * | 7/1992 | Kishimoto et al. ......... 345/126 |
| 5,189,404 A | * | 2/1993 | Masimo et al. ............. 345/115 |
| 5,241,303 A | * | 8/1993 | Register et al. ............. 345/168 |
| 5,329,289 A | * | 7/1994 | Sakamoto et al. .......... 345/126 |
| 5,533,185 A | * | 7/1996 | Lentz et al. ................. 345/563 |
| 5,534,718 A | | 7/1996 | Chang |
| 5,644,653 A | * | 7/1997 | Sunakawa et al. .......... 382/187 |
| 5,661,632 A | * | 8/1997 | Register ...................... 361/683 |
| 5,798,750 A | | 8/1998 | Ozaki |
| 5,805,415 A | * | 9/1998 | Tran et al. ................... 361/681 |
| 5,825,675 A | | 10/1998 | Want et al. |
| 5,936,619 A | * | 8/1999 | Nagasaki et al. ........... 345/205 |
| 5,973,664 A | * | 10/1999 | Badger ........................ 345/659 |

FOREIGN PATENT DOCUMENTS

EP  0431581 A2 * 12/1991

* cited by examiner

*Primary Examiner*—Steven Saras
*Assistant Examiner*—Amr Awad
(74) *Attorney, Agent, or Firm*—Kenyon & Kenyon

(57) ABSTRACT

A displaceable display and a method for controlling an output of a display unit are disclosed. The display arrangement includes a circuit board, a display unit, a detector and a controller. The display unit communicates with the circuit board. The display unit is capable of rotating with respect to the circuit board and being placed in at least one particular orientation with respect to the circuit board. The detector automatically detects the particular orientation of the display unit with respect to the circuit board. The circuit board transmits signals to the controller and the controller routes the signals to output of the display unit as a function of the particular orientation.

31 Claims, 13 Drawing Sheets

DISPLACEABLE DISPLAY ARRANGEMENT

FIELD OF THE INVENTION

The present invention relates generally to display arrangements, and, more specifically, to a displaceable display arrangement.

BACKGROUND INFORMATION

A conventional display arrangement coupled to a sensor arrangement tend not to be flexible with respect to the placement of the display arrangement on a supporting structure (e.g., a sensor arrangement). An example of the conventional display arrangement coupled to the sensor arrangement (e.g., a pressure sensor) a pressure sensor, provides this combination mounted on a wall of a large tank of liquid.

Once mounted, it is often impractical to change the orientation of the conventional display arrangement with respect to the sensor arrangement. In conventional display arrangements, changing the orientation of the conventional display arrangement might entail re-orienting circuit boards of the combination. Unfortunately, the re-orientation of circuit boards is not always possible under particular configurations, especially where space is very limited and the circuit boards and the circuitry therein are not resilient to displacement.

Furthermore, because the conventional display arrangement includes a display unit that has a fully functional circuit board included therein, it may be inconvenient or not feasible to access and displace the circuit board of such display unit.

SUMMARY OF THE INVENTION

The present invention provides a display arrangement which includes a circuit board, a display unit, a detector and a controller. The display unit communicates with the circuit board. The display unit is capable of rotating with respect to the circuit board and being placed in at least one particular orientation with respect to the circuit board. The detector automatically detects the particular orientation of the display unit. The circuit board transmits signals to the controller and the controller routes the signals to the display unit as a function of the particular orientation.

The present invention also provides a method for controlling an output of a display unit. An orientation of the display unit with respect to a circuit board is automatically detected, and output signals from the circuit board are received. Then, the output signals are routed to the output of the display unit as a function of the orientation of the display unit.

DETAILED DESCRIPTION

Figure 1:
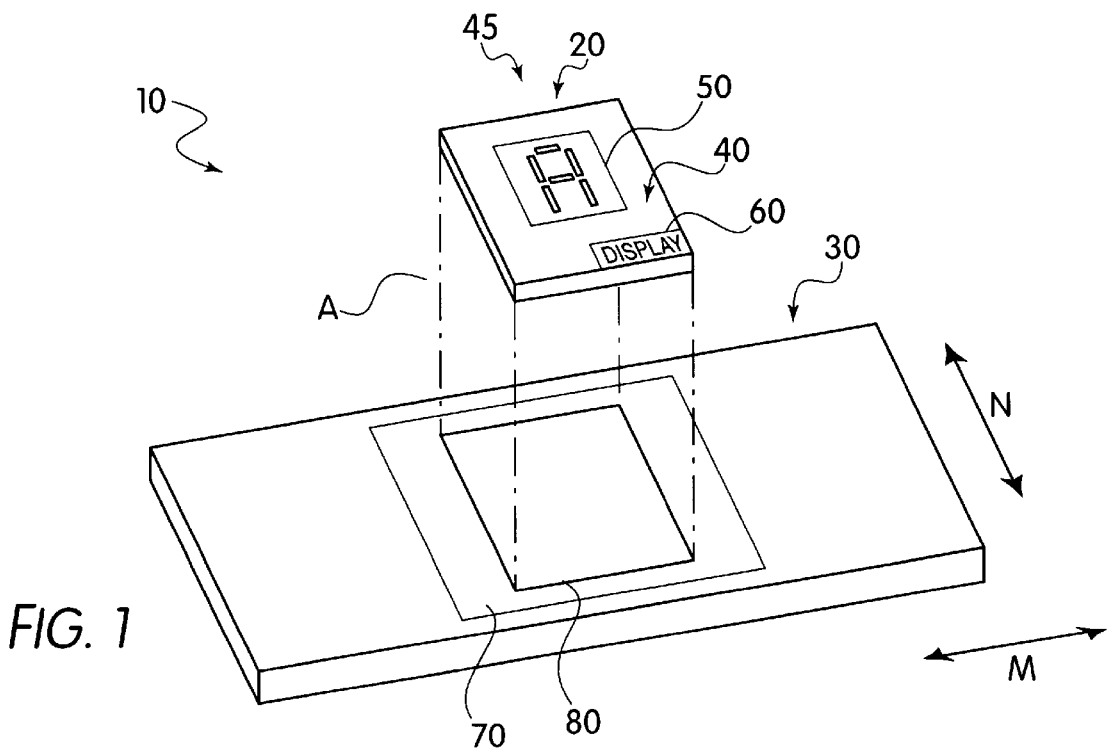
FIG. 1 illustrates an enlarged view of an embodiment of a displaceable display arrangement according to the present invention with a circuit board in a first orientation.

FIG. 1 illustrates an enlarged view of an embodiment of a displaceable display arrangement 10 according to the present invention. The displaceable display arrangement 10 includes a display unit 20 which is mountable on (or connectable) to a circuit board 30.

The display unit 20 includes a display screen 40. The display screen 40 may be, for example, a liquid crystal display (LCD) or a light emitting diode (LED) display. In FIG. 1, the display unit 20 is disposed on the circuit board in a first orientation A, which is the orientation for optimal viewing of the display screen along a line of sight 45 of a user. FIG. 1 further illustrates that the display unit 20 has a square shape; however, other shapes, such as, for example, regular polygons and circular shapes are within the scope of the present invention.

The display screen 40 includes a first display field 50 (which may be, for example, variable) and, optionally, a second display field 60 (which may be, for example, non-changeable or fixed). The first display field 50 may display, for example, symbols, alphanumeric characters or groups of alphanumeric characters which may be updated upon demand. In a preferred embodiment of the present invention, the display unit 20 does not include any circuit board for controlling an output of the first display field 50. The first display field 50 illustrated in FIG. 1 shows, as an example, a single alphanumeric character, e.g., a character "A"; however, this exemplary displayed character should not be construed as a limitation of the present invention. Indeed, one or more characters and/or symbols may be displayed on the display screen 40.

In addition, the second display field 60 may include, for example, symbols, alphanumeric characters or groups of alphanumeric characters. However, the symbols, alphanumeric characters or groups of alphanumeric characters are permanently burned, etched or printed on or within the display screen 40. The second display field 60 illustrated in FIG. 1 shows, for example, a word "DISPLAY"; however, this exemplary displayed word should not be construed as a limitation of the present invention.

Alternatively, the second display field 60 can be a quasi-permanent display field in which at least one of several sets of symbols, alphanumeric characters or groups of alphanumeric characters can be selectively displayed by the display screen 40. For example, if the second display field 60 is showing the units of measurements, then the selected symbols, alphanumeric characters or groups of alphanumeric characters selectively, may be either English or metric units.

Thus, the first display field 50 may display changing numbers representing variable measurements while the second display field 60 can display the metric units of measurement.

The circuit board 30 includes a circuit arrangement 70 and a mounting location 80 for coupling the circuit board 30 to the display unit 20. In one embodiment according to the present invention, the circuit arrangement 70 includes all of the circuitry for powering and controlling the display unit 20. The mounting location 80 provides a coupling arrangement for electrically and mechanically connecting the display unit 20 to the circuit arrangement 70. FIG. 1 illustrates the mounting location 80 having a square shape to approximately match the shape of the display unit 20. The mounting location 80 may also have other shapes such as a circular shape or a regular-polygonal shape. Furthermore, the mounting location 80 may have shapes that approximately match the shape of the display unit 20 which is rotated at various angled intervals.

Figure 2:
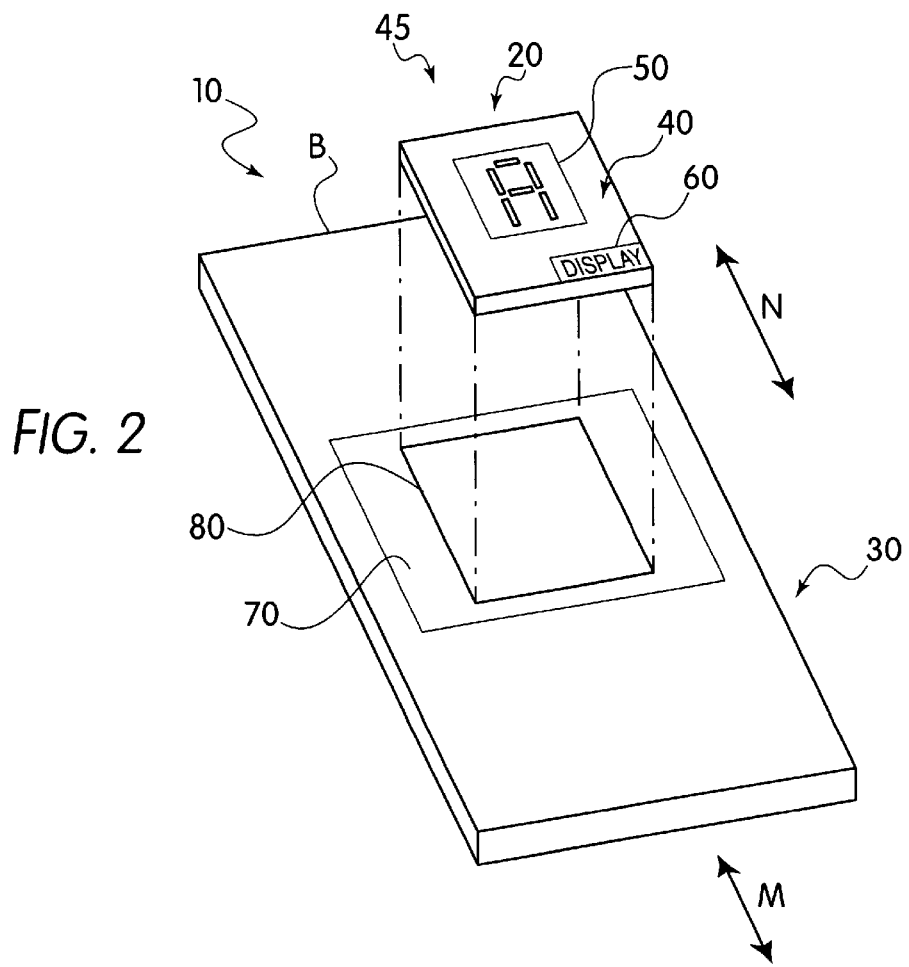
FIG. 2 illustrates the enlarged view of the embodiment of the displaceable display arrangement according to the present invention with the circuit board in a second orientation.

FIG. 2 illustrates an enlarged view of the displaceable display arrangement 10 in which the display unit 20 is in a second orientation B with respect to the display unit 20. The display unit 20 shown in FIG. 2 has been rotated 90 degrees from the position of the display unit 20 illustrated in FIG. 1, i.e., from the first orientation A.

This rotation B of the display unit 20 is selected to allow the user of the arrangement to view the first and the second display fields 50, 60 regardless of the orientation of the circuit board 30.

Despite the fact that the display unit 20 is rotated 90 degrees with respect to the circuit board 30, and particularly, with respect to the circuit arrangement 70 and the mounting location 80, the first field display 50 of the display unit 20 is oriented for optimal viewing of the user along the line of sight 45 of the user. Furthermore, since the display unit 20 has not been rotated with respect to the line of sight 45, the second display field 60 is also oriented for optimal viewing along the line of sight 45.

In operation, the display unit 20 and the circuit board 30 may be initially disposed in the first orientation A with the display unit 20 being removably mounted at the mounting location 80 of the circuit board 30.

Subsequently, the display unit 20 may be oriented in the second orientation B, e.g., by lifting the display unit 20 from the mounting location 80 of the circuit board 30 and rotating the display unit 20 90 degrees with respect to a particular axis of extension M of the circuit board 30. Other orientations are also possible, depending on the user preferred position of the display unit 20. The display unit 20 can then be re-mounted onto the mounting location 80. An axis of extension N of the display unit 20 is then positioned 90 degrees with respect to the particular axis M of the circuit board 30.

Although the display screen 40 may be oriented for optimal viewing along the line of sight 45 and along the axis N, input signals provided by the circuit arrangement 70 of the circuit board 30 to the display unit 20 may require some rearrangement.

The circuit arrangement 70 (or a control arrangement which is provided in communication with the circuit arrangement 70) ascertains that the display unit 20 has been re-oriented with respect to the circuit board 30. Furthermore, the circuit arrangement 70 (or the control arrangement) determines the extent of the re-orientation (e.g., determines an angle of rotation between the particular axis M and the axis N). Using the orientation information, the circuit arrangement 70 (or the control arrangement) can transmit input signals to the display unit 20, by taking into account the current orientation of the display unit 20 with respect to the circuit board 30, and may generate an output from the display unit 20 regarding its orientation. For example, the display unit 20 displays the output for viewing along the line of sight 45 and for easy viewing by the user (with the user being positioned approximately along the axis N and looking down on a front face of the display unit 20).

Although FIG. 2 illustrates the rotation of 90 degrees between the display unit 20 and the circuit board 30, the amount of rotation is merely exemplary. The arrangement 10 of the present invention also allows the circuit board 30 and the display unit 20 to be rotated numerous degrees of rotation.

Figure 3:
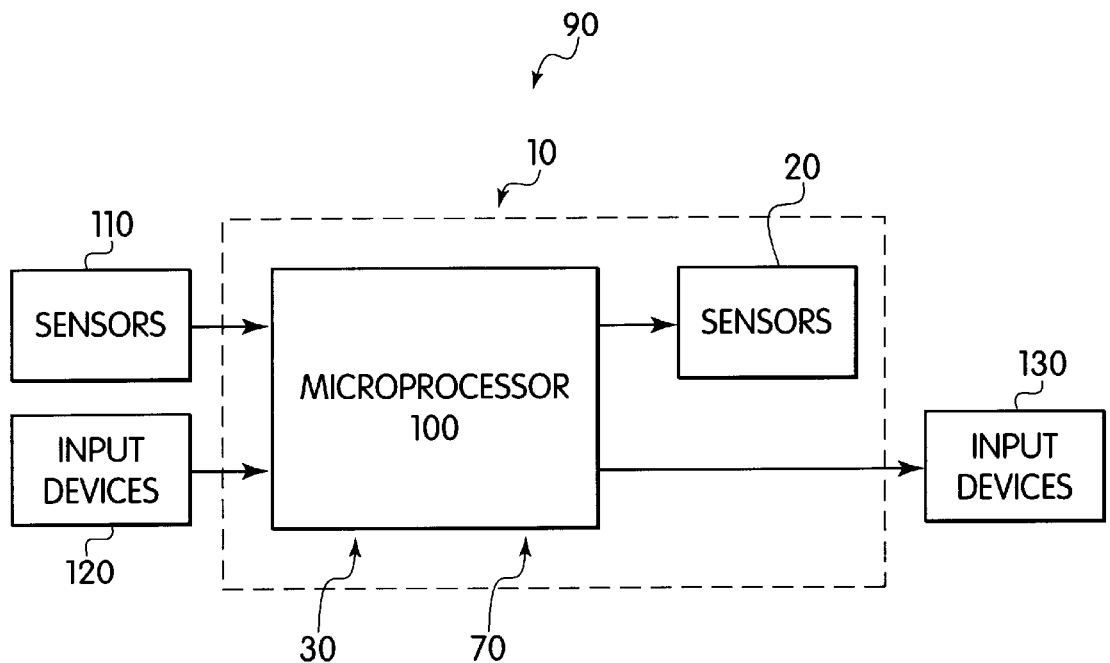
FIG. 3 shows a block diagram illustrating an embodiment of the displaceable display arrangement in a pressure sensor arrangement according to the present invention.

FIG. 3 shows a block diagram illustrating an embodiment of the displaceable display arrangement 10 in an exemplary pressure sensor arrangement 90 according to the present invention. The circuit board 30 includes the circuit arrangement 70 which, in turn, has a microprocessor 100. It is also possible that the microprocessor is positioned externally from the circuit arrangement 70 and is in communication therewith. The microprocessor 100 powers and controls the display unit 20. The microprocessor 100 has at least one set of inputs from, for example, pressure sensors 110 and, optionally, from other input devices 120. The microprocessor 100 has at least one set of outputs, for example, to the display unit 20 and, optionally, to other output devices 130.

In operation, the pressure sensor arrangement 90 may be mounted via a duct in a wall of a large tank filled with a liquid mixture. The pressure sensors 110 can, for example, be immersed in the liquid mixture on one side of the wall (i.e., an external side of the wall). The circuit board 30 can, for example, be on the other side of the wall. The sensors 110 generally sense the pressure of the liquid mixture. The pressure may be transmitted to the circuit board 30 to generate a corresponding electrical signal, or the sensors 110 may include transmitters which generate corresponding electrical signals which are received by the circuit board 30. Then, the microprocessor 100 processes the electrical signals and converts them into actual or relative pressure values. The actual or relative pressure values are converted into operating and control signals which are displayed via the display unit 20.

The optional input devices 120 may be, for example, sensors for different parameters such as temperature, acidity, or oxygenation. The input devices 120 may include user interfaces such as for example, key pads, or values retrieved from memory storage devices. The output devices 130 may be, for example, memory storage devices or other signal processing devices such as computers.

When the pressure sensor arrangement 90 is mounted, for example, on the wall of the tank via the duct in the wall, the circuit board 30 can, under certain circumstances, be immovably fixed to the wall of the tank. The sensor arrangement 90 may be fixed in a position which would ordinarily rotate the display unit 20 coupled thereto into a position in which it would be uncomfortable or inconvenient for the user to view the output on the display unit 20. Thus, without the ability to re-orient the display unit 20 with respect to the circuit board 30, the display unit 20 may not be easily readable by the user or awkwardly disposed. Thus, by re-orienting the display unit 20 with respect to the circuit board 30, the user may achieve optimal viewing of the output of the display unit 20.

In the embodiment illustrated in FIG. 3, the microprocessor 100 determines if the display unit 20 has been re-oriented using outputs of the circuit board 30. Accordingly, the microprocessor 100 re-routes the operating instructions and control signals so that the first display field 50 of the display screen 40 is correctly oriented for optimal viewing by the user.

Figure 4:
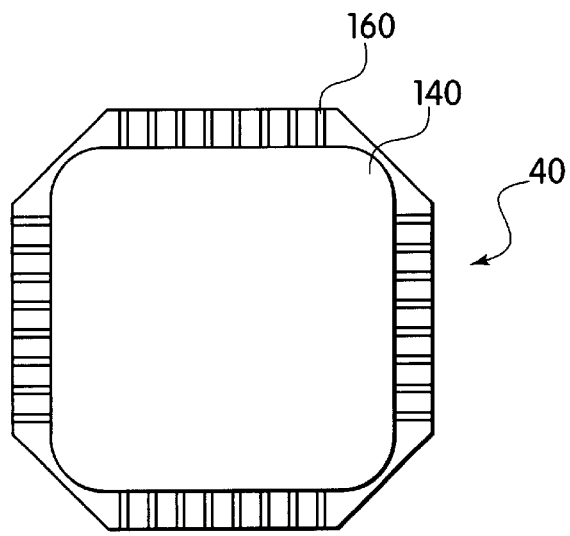
FIG. 4 illustrates a back view of an embodiment of a display screen of a display unit according to the present invention.
Figure 5:
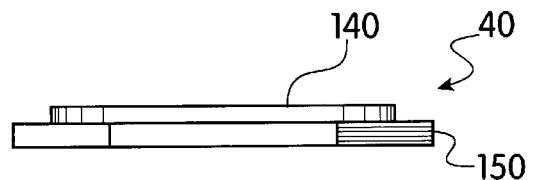
FIG. 5 illustrates a side view of the embodiment of the display screen of the display unit.

FIGS. 4 and 5 illustrate a back view and a side view, respectively, of an embodiment of the display screen 40 of the display unit 20. The display screen 40 includes a liquid crystal element 140, for example, mounted on a glass plate 150. The glass plate 150 includes metallized contacts 160 through which the circuit arrangement 70 (using, for example, the microprocessor 100) powers and controls the liquid crystal element 140.

Figure 6:
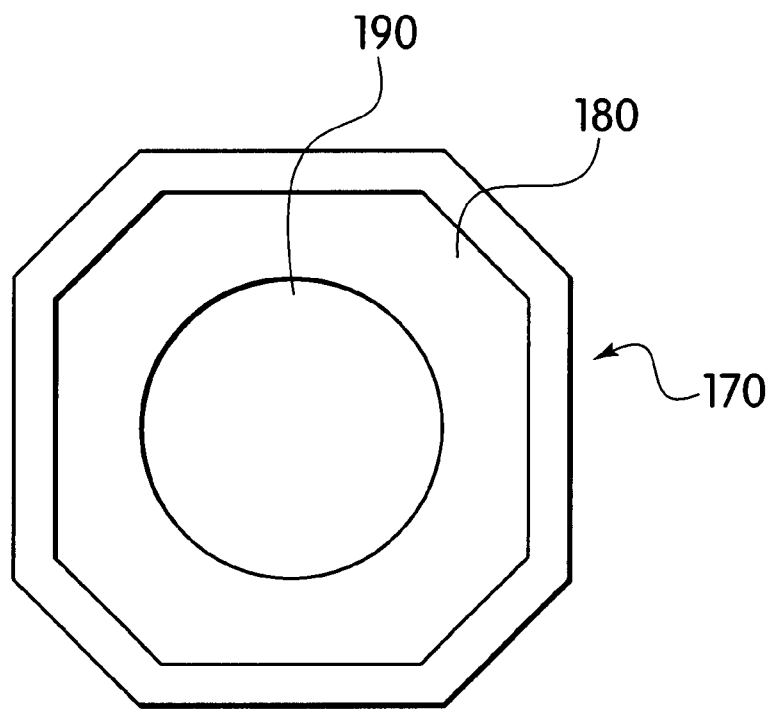
FIG. 6 illustrates a back view of an embodiment of a display screen housing of the display unit.
Figure 7:
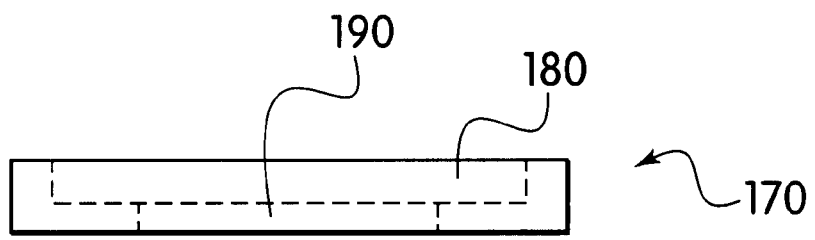
FIG. 7 illustrates a side view of the embodiment of the display screen housing of the display unit.

FIGS. 6 and 7 illustrate a back view and a side view, respectively, of an embodiment of a display screen housing 170 of the display unit 20. The display screen housing 170 includes a recessed section 180 and a window 190. The recessed section 180 has a particular shape and form for receiving and accommodating the display screen 40 as shown in FIGS. 4 and 5. For example, the window 190 may have a circular shape.

Figure 8:
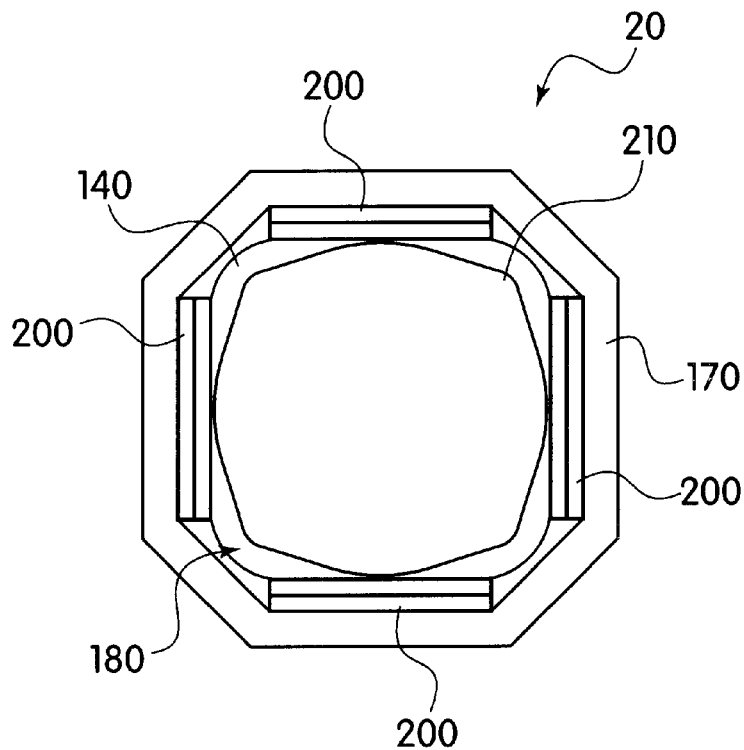
FIG. 8 illustrates a back view of an embodiment of the display unit.

FIG. 8 illustrates a back view of an embodiment of the display unit 20 according to the present invention. The display unit 20 includes the display screen 40, the display screen housing 170, four pads 200 and an elastic guide 210.

The display screen 40, as shown in FIGS. 4 and 5, is placed in the recessed section 180 of the display screen housing 170, which is illustrated in FIGS. 6 and 7. The four pads are placed on top of the metallized contacts are which are maintained in place against inner walls of the recessed section 180 by the elastic guide 210. The elastic guide 210 is shaped, for example, to maintain the four pads 200 in position by an elastic force. The four pads 200 are soft and elastic, and enable the display unit 20 to electrically communicate with the circuit board 30. The four pads 200 extend, at least in part, out of the recessed section 180 to provide a cushioned contact with the mounting location 80 of the circuit board 30 when the display unit 20 is mounted on the circuit board 30.

Figure 9:
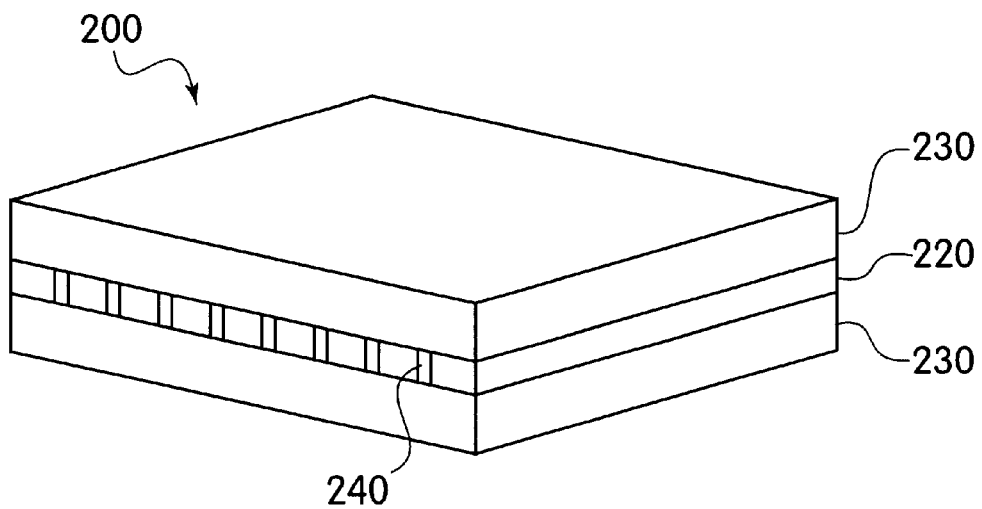
FIG. 9 illustrates an embodiment of a pad which connects the display unit to other components of the displaceable display arrangement.

FIG. 9 illustrates an embodiment of the pad 200 according to the present invention. The pad 200, as shown, has a rectangular shape with three layers. A middle layer 220 is provided between two insulating layers 230. The middle layer 220 includes a plurality of conductive channels 240. The conductive channels 240 enable electrical communications between the metallized contacts 150 of the display screen 40 and the circuit arrangement 70 of the circuit board 30.

Figure 10:
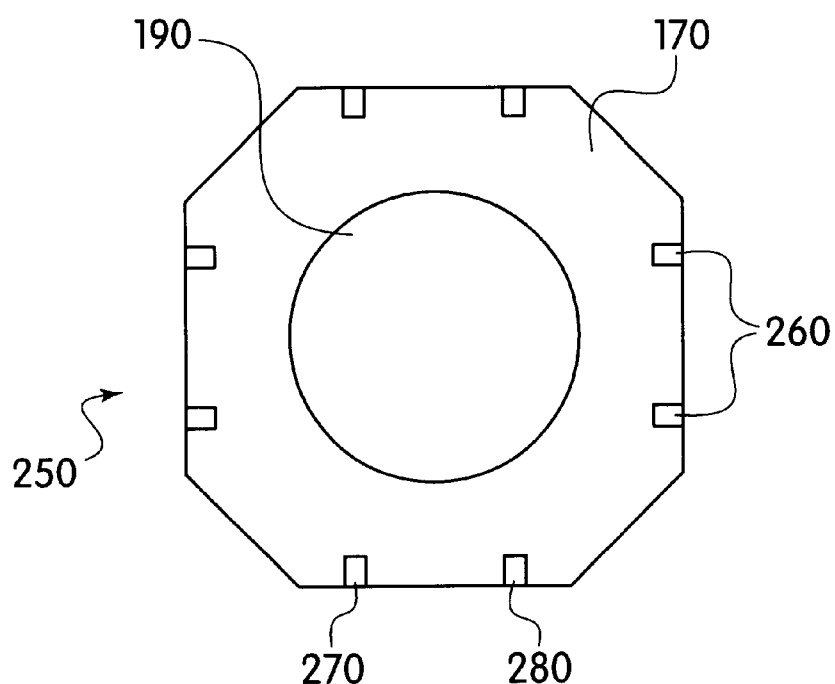
FIG. 10 illustrates a top view of the display screen housing having four sets of notches according to the present invention.
Figure 11:
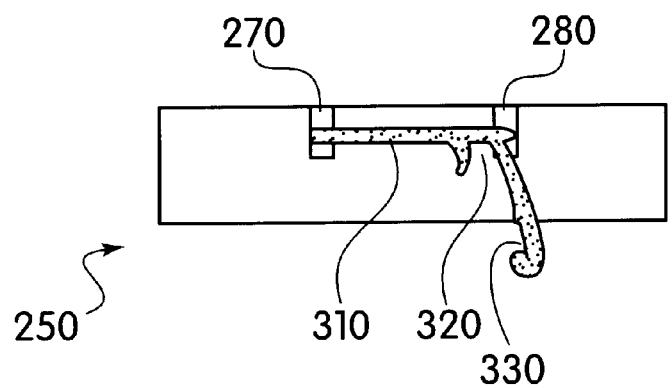
FIG. 11 illustrates a side view of a section of the coupling arrangement for the display unit.
Figure 12:
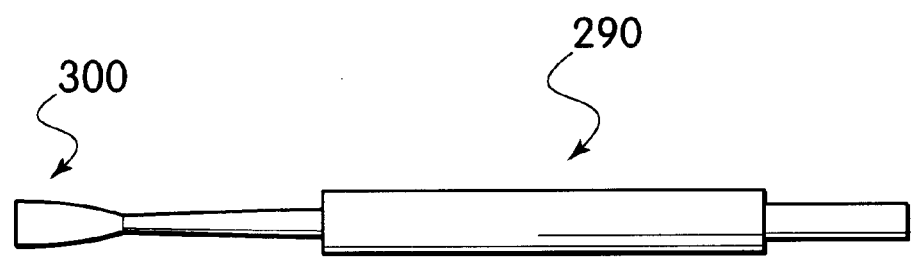
FIG. 12 illustrates an external tool which can be used to removed the display unit from the displaceable display arrangement.

FIGS. 10 and 11 illustrate a coupling arrangement 250 for the display unit 20. FIG. 10 shows a top view of the display screen housing 170 with four sets of notches 260. Each set of notches 260 may include two notches, e.g., a decoupling notch 270 and a coupling notch 280. The notches 270, 280 are shaped to cooperate with an external tool 290 illustrated in FIG. 12. The external tool 290 has, for example, a Phillips screw driver tip 300 which fits, at least in part, into the notches 270, 280. Other tips, e.g., star, hex, etc., of the external tool 290 are also contemplated by the present invention.

FIG. 11 illustrates a side view of a section of the coupling arrangement 250 for the display unit 20 according to the present invention. A coupling mechanism 310 is disposed across the notches 270, 280. The coupling mechanism 310 pivots around a pivot point 320.

The display unit 20 is disposed, for example, on a top portion of the circuit board 30, in particular, over the mounting location 80. The display unit 20 is coupled to the circuit board 30 by inserting the tip 300 of the external tool 290 into the coupling notch 280, such operation forces the coupling mechanism 310 downward and clockwise around the pivot point 320. The displacement of the coupling mechanism results in a hook 330 engaging with either a bottom portion of the circuit board 30 or a recess adapted to accommodate the hook 330. The process is repeated for each of the remaining sets of notches 260. The engagement of the hook 330 also provides for the compression of the four pads 200 (shown in FIG. 8), thus ensuring a resilient contact between the circuit board 30 and the metallized contacts 160 of the display screen 40. To decouple the display unit 20 from the circuit board 30, the tip 300 of the external tool 290 is driven, at least in part, into the decoupling notch 270. In response, the coupling mechanism 310 is forced counter-clockwise around the pivot point 320, and the hook 330 releases either the bottom portion of the circuit board 30 or the recess which is adapted to accommodate the hook 330.

Figure 13:
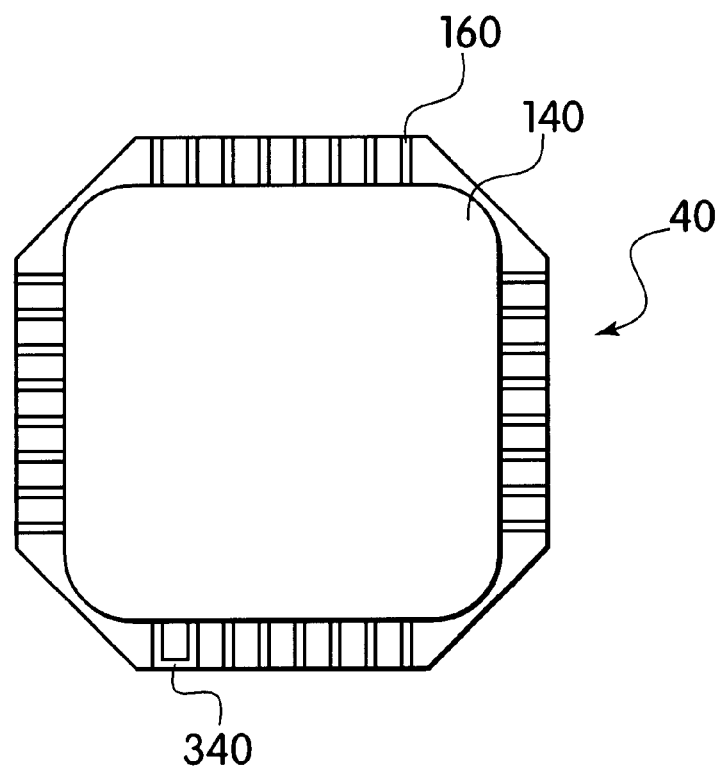
FIG. 13 illustrates an embodiment of the display screen according to the present invention.

FIG. 13 illustrates another embodiment of the display screen 40 according to the present invention. The embodiment of the display screen 40 shown in FIG. 13 is the same as the display screen 40 illustrated in FIG. 4, except that two particular contacts of the metallized contacts 160 are interconnected to create a short circuit 340. In operation, when the display screen 40 is coupled to the circuit board 30, the circuit arrangement 70, or a control arrangement (which may or may not include the microprocessor 100) determines which two contacts of the metallized contacts 160 are interconnected, thereby creating between the metallized contacts 160 the short circuit 340. Upon determining the location of the short circuit 340, the circuit arrangement 70 (or the control arrangement) can ascertain the orientation of the display unit 20 with respect to the circuit board 30, in particular, with respect to the circuit arrangement 70. After determining the orientation of the display unit 20 with respect to the circuit board 30, the circuit arrangement 70

(for example, via the microprocessor 100) may power and control the display unit 20 so that the output of the display screen 40 is oriented for the desired line of sight 45 of the user.

Figure 14:
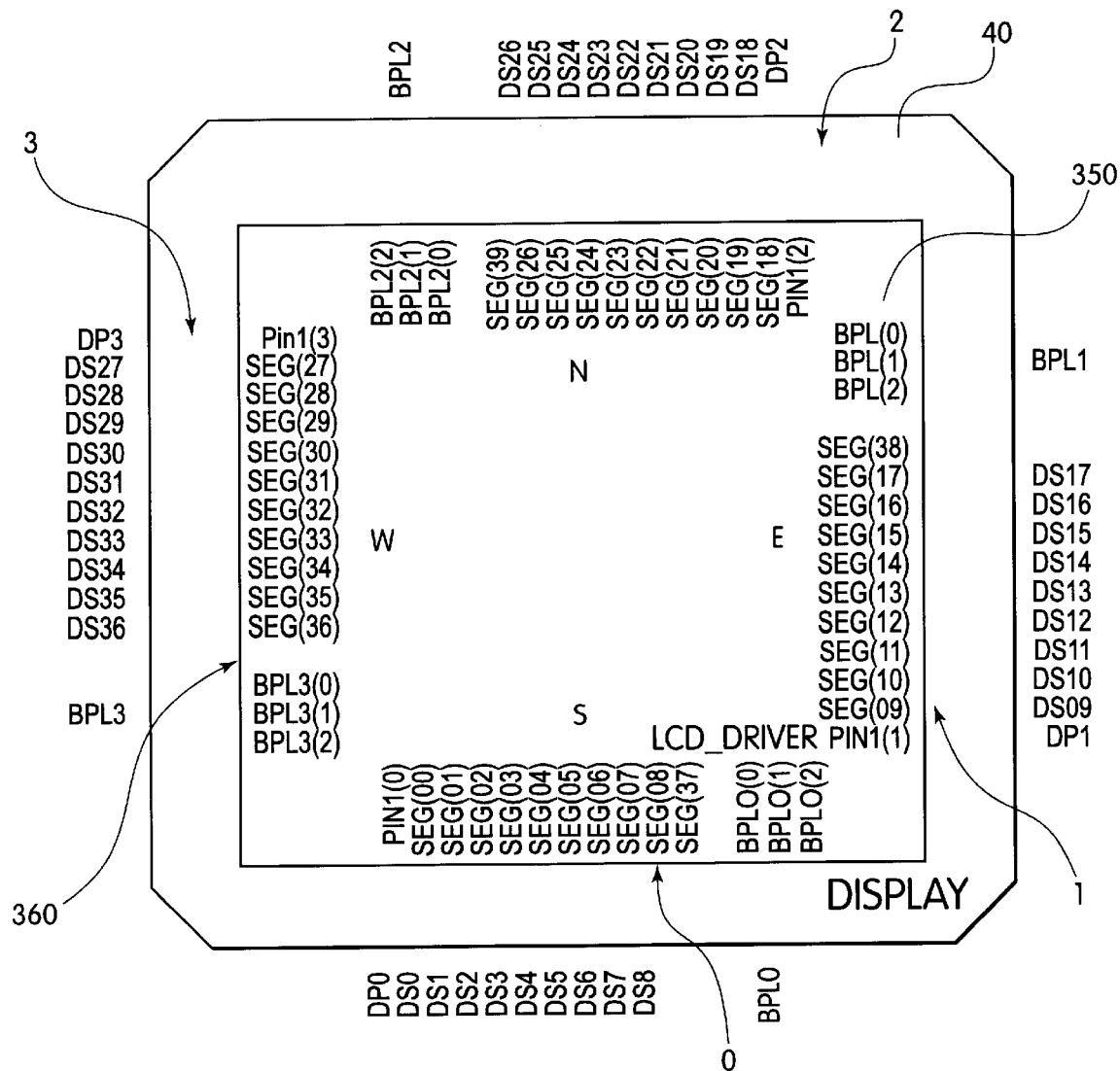
FIG. 14 illustrates an arrangement according to the present invention which includes the display screen and an liquid crystal display (LCD) driver.
Figure 15:
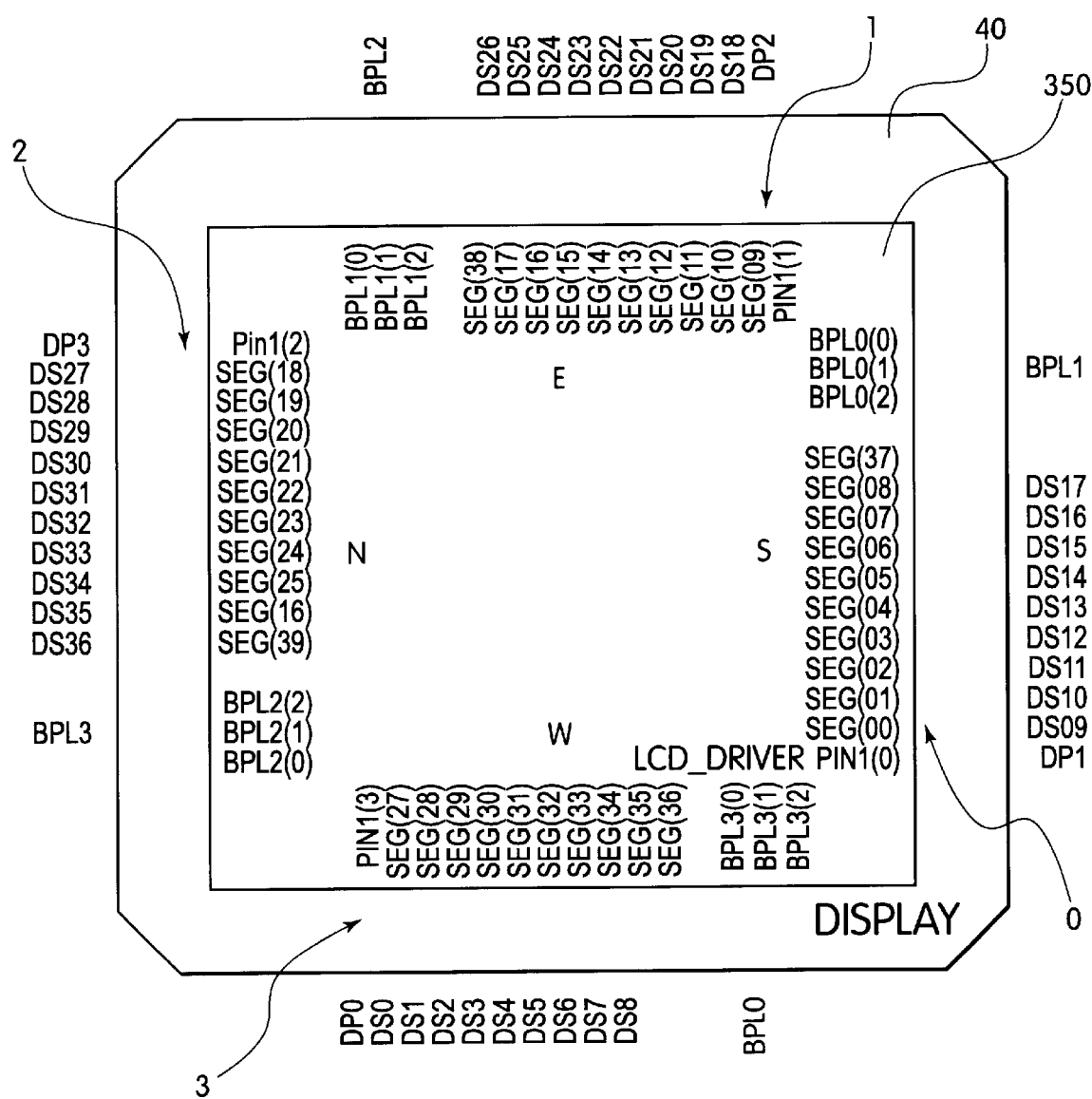
FIG. 15 illustrates the arrangement according to the present invention in which the display screen is rotated clockwise 90 degrees with respect to the LCD driver.
Figure 16:
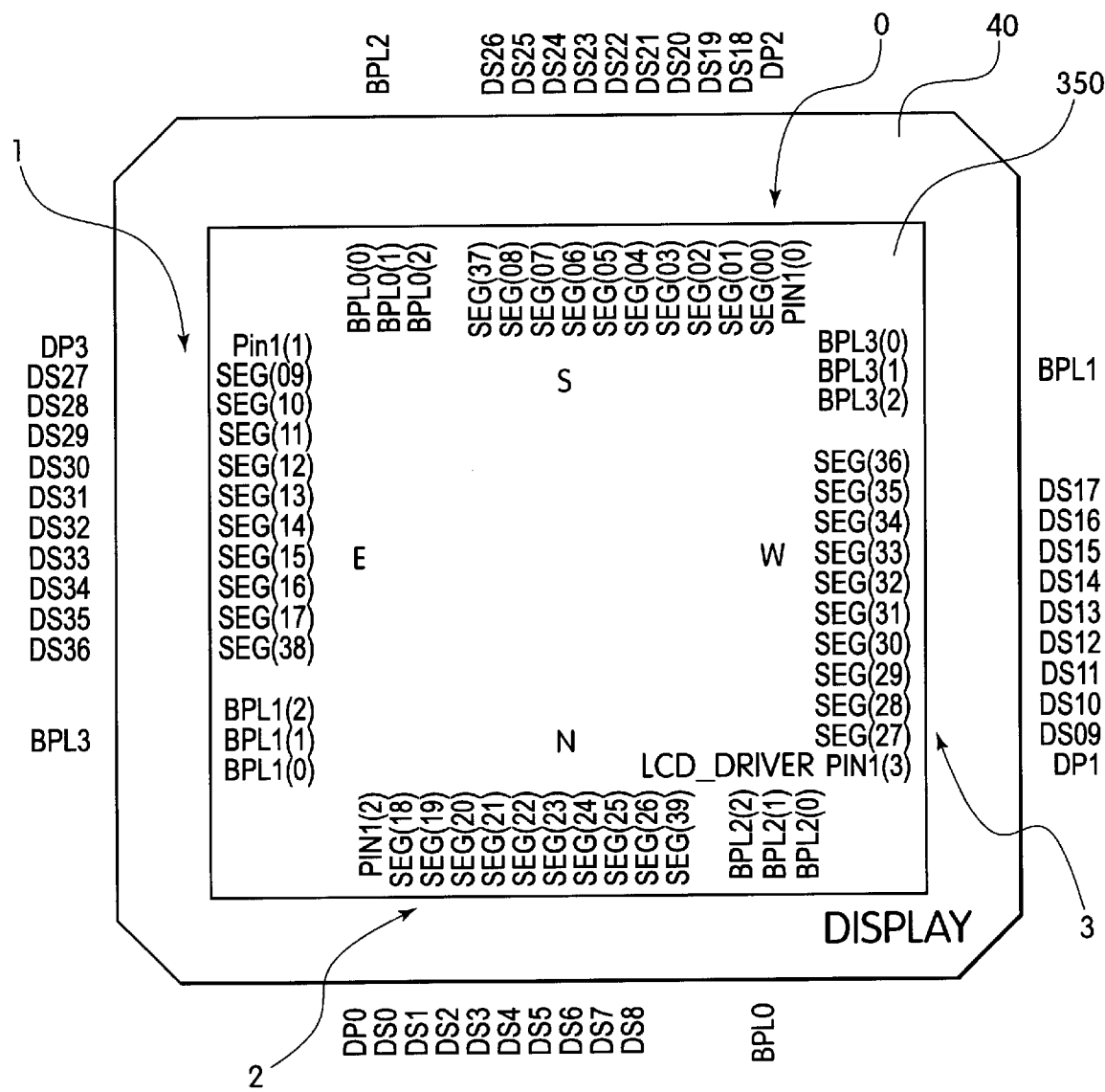
FIG. 16 illustrates the arrangement according to the present invention wherein the display screen is rotated 180 degrees with respect to the LCD driver.
Figure 17:
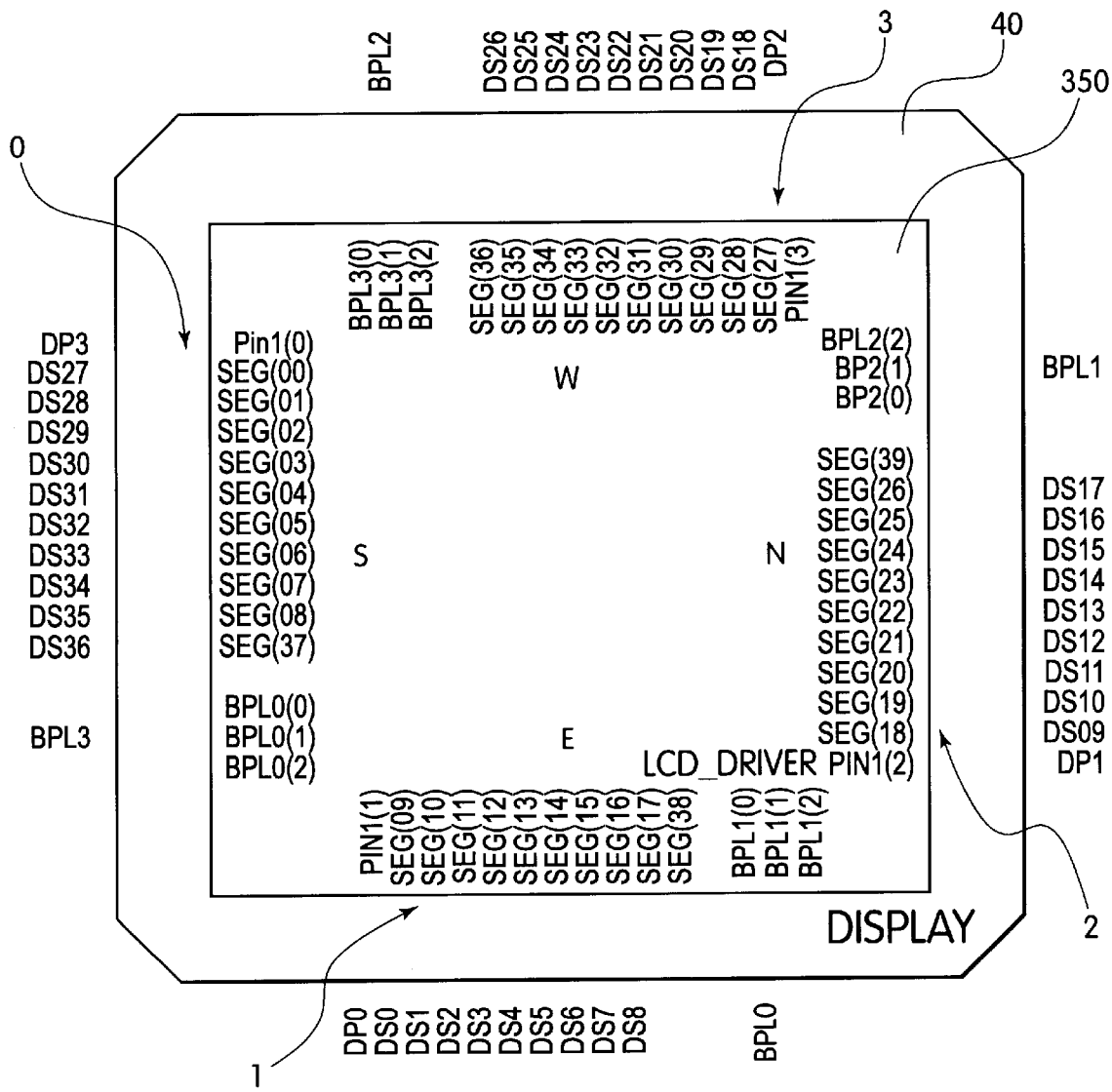
FIG. 17 illustrates the arrangement according to the present invention wherein the display screen is rotated clockwise 270 degrees with respect to the LCD driver.

FIGS. 14–17 illustrates an embodiment of the display arrangement 40 in which the circuit arrangement 70 includes a liquid crystal display (LCD) driver 350. FIGS. 14–17 also illustrate the cooperation of the metallized contacts 160 of the display screen 40 with the pins 360 of the LCD driver 350. In FIG. 14, the display screen 40 has not been rotated with respect to the LCD driver 350. In FIG. 15, the display screen 40 has been rotated 90 degrees with respect to the LCD driver 350. In FIG. 16, the display screen 40 has been rotated 180 degrees with respect to the LCD driver 350. In FIG. 17, the display screen 40 has been rotated 270 degrees with respect to the LCD driver 350.

As shown in FIGS. 14–17, the LCD driver 350 controls 40 segments via pin locations SEG(00) through SEG(39). The LCD driver 350 also includes back-plane pin locations BPLm(n) where m and n are integers between 0 and 3. The display screen 40 includes display-segment pin locations DS0 through DS36 and back-plane pin locations BPL0 through BPL3. The display screen 40 also includes display pin locations DP0 through DP3.

Figure 18:
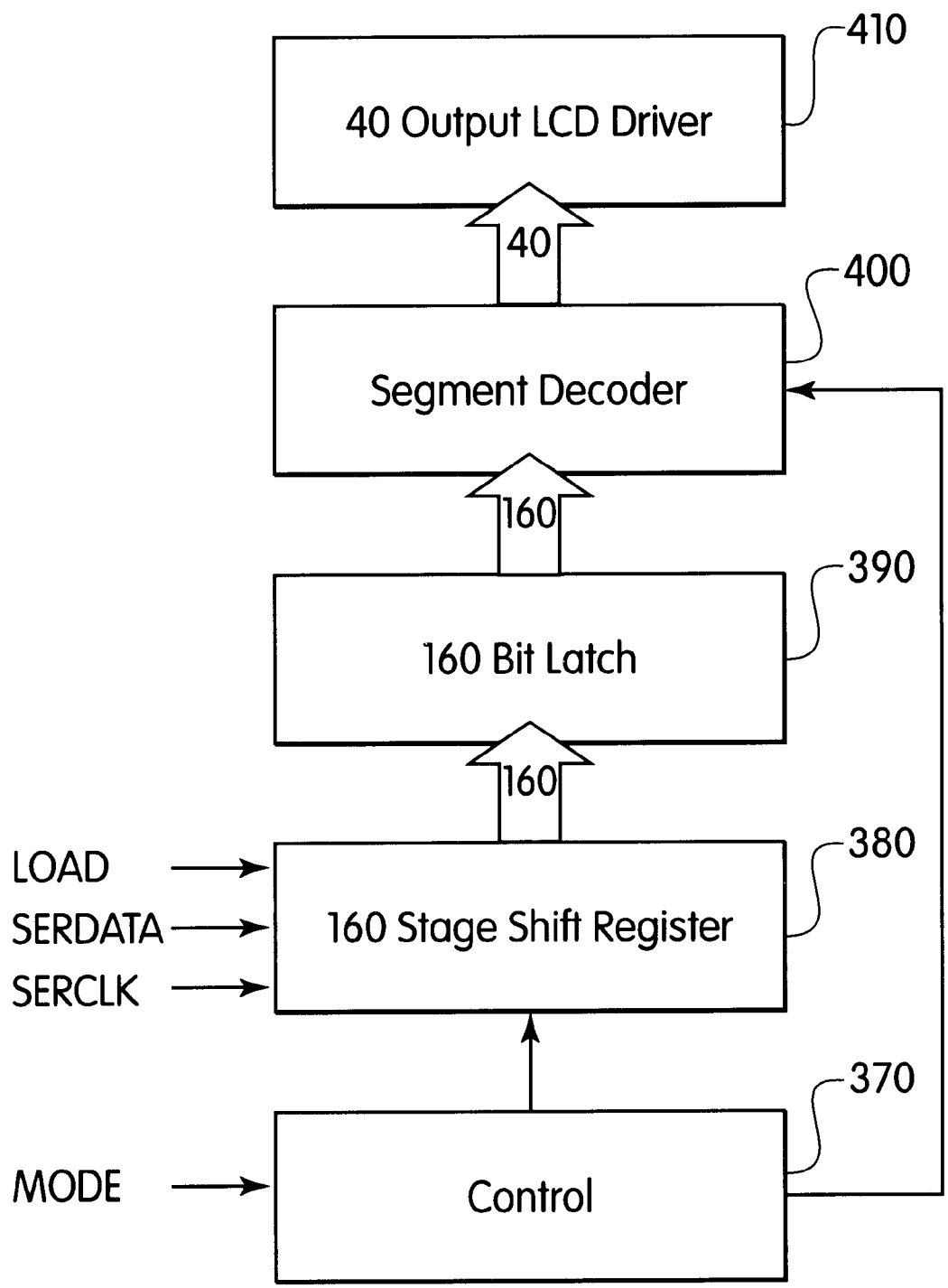
FIG. 18 illustrates a block diagram of an embodiment of the LCD driver according to the present invention.

FIG. 18 illustrates a block diagram of an embodiment of the LCD driver 350 according to the present invention. The LCD driver 350 includes a controller 370, a 160-stage shift register 380, a 160-bit latch 390, a segment decoder 400 and a 40-output LCD segment driver 410. The 160-stage shift register has at least three input lines including a serial data line SERDATA, a load signal line LOAD and a serial clock signal line SERCLK.

Display data is serially input to the 160-stage shift register via the serial data line SERDATA. The 160-stage shift register is synchronized by a clock signal from the serial clock signal line SERCLK. Upon receipt of a LOAD signal from the load signal line LOAD, the 160-stage shift register 380 is transferred to the 160-bit latch 390. The latched data is decoded by the segment decoder 400. A MODE signal on a control input line MODE is received by the controller 370 which controls the segment decoder 400. The MODE signal determines a mode selection, for example, either a straight connection when maintained low, or a special encode when maintained high.

Figure 19:
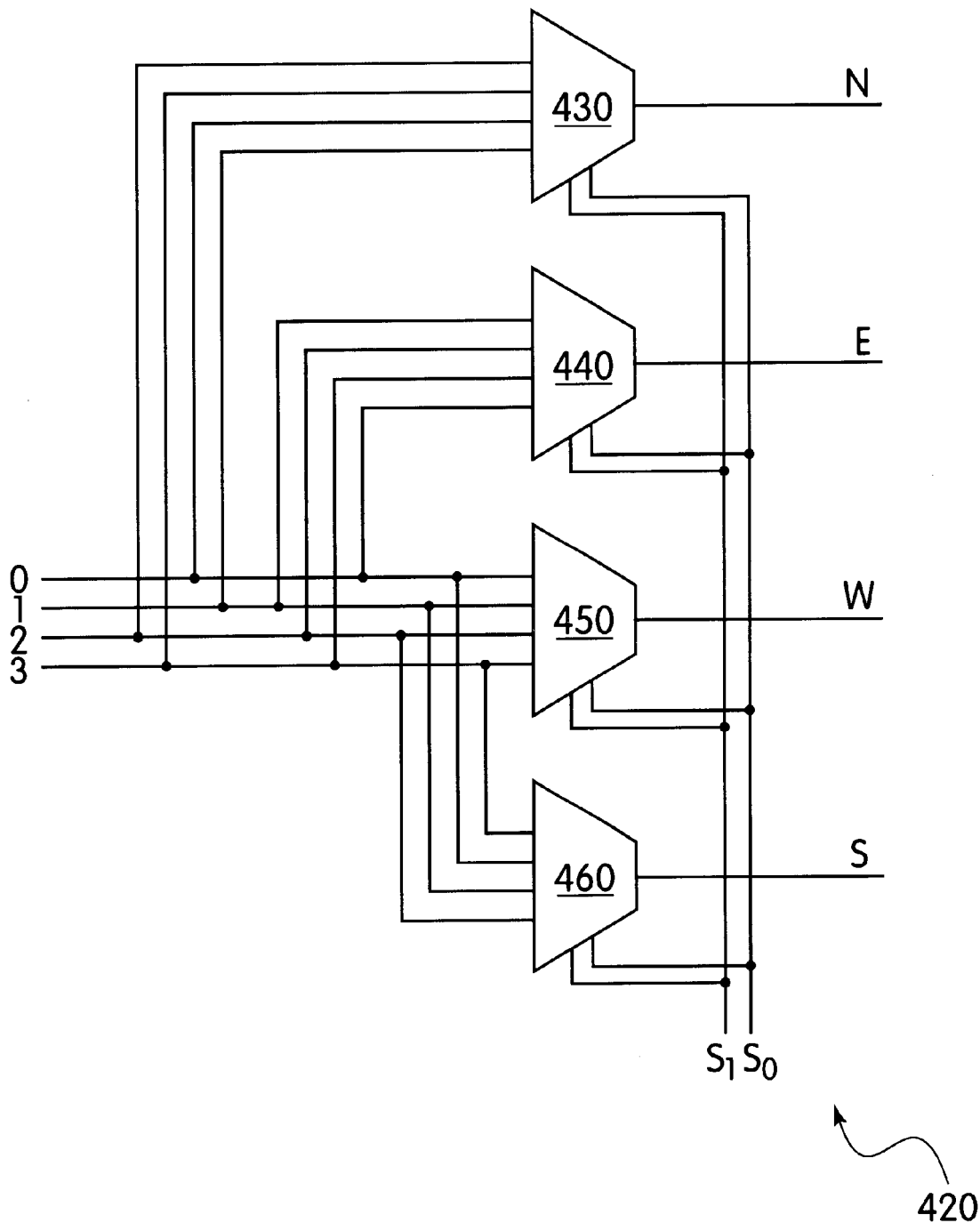
FIG. 19 illustrates an example of a four-phase dynamic display operation according to the present invention wherein the output signal sequence is controlled by four back plane signals.

From the segment decoder 400, the data is output to the 40-output LCD segment driver 410 in four phases. FIG. 19 illustrates an example of a four-phase dynamic display operation according to the present invention, in which the output signal sequence is controlled by four back plane signals.

The routing from the outputs of the pins 360 of the LCD driver 350 to the proper metallized contacts 160 of the display screen 40 depends upon, for example, how much the display screen 40 has been rotated with respect to the LCD driver 350. Once the orientation of the display screen 40 with respect to the LCD driver 350 has been ascertained, the re-routing of the outputs of the LCD driver 350 can be achieved via software, hardware or a combination thereof.

FIG. 19 illustrates an exemplary embodiment of routing (or firmware) arrangement 420 according to the present invention. The routing arrangement 420 includes four multiplexers 430, 440, 450, 460. Each of the multiplexers has four input lines, one output line and two select lines $s_0$, $s_1$.

Reference is made to directions north N, south S, east E and west W, as defined and shown in FIGS. 14–17. These directions remain constant with respect to the LCD driver 350 even when the display screen 40 is rotated with respect to the LCD driver 350. Furthermore, the pins 360 of the LCD driver 350 will be specified below by referencing a particular side. Thus, pins 0 refer to the pins on the south side of the LCD driver 350; pins 1 refer to the pins on the east side of the LCD driver 350; pins 2 refer to the pins on the north side of the LCD driver 350; and pins 3 refer to the pins on the west side of the LCD driver 350.

To illustrate such correspondence, FIG. 15 shows that the display screen 40 has been rotated 90 degrees clockwise with respect to the LCD driver 350, the pins 0 face the south side pins of the display screen 40, in this case, pins DP1, DS09 through DS17, BPL1; the pins 1 face the east side pins of the display screen 40, in this case, pins DP2, DS18 through DS26, BPL2; the pins 2 face the north side pins of the display screen 40, in this case, pins DP3, DS27 through DS36, BPL3; and the pins 3 face the west side pins of the display screen 40, in this case, pins DP0, DS0 through DS8, BPL0. FIGS. 14, 16 and 17 can be similarly described.

Referring to FIG. 19, the routing arrangement 420 couples to the pins 0, 1, 2, 3 to the corresponding metallized contacts 160 of the display screen 40 as a function of the orientation of the display screen 40 with respect to the LCD driver 350. The input to each of the four multiplexers 430, 440, 450, 460 are coupled to the four sets of pins 0, 1, 2, 3 in different configurations as shown in FIG. 19. The output of each of the four multiplexers 430, 440, 450, 460 is coupled to the metallized contacts 160 on a respective side of the display screen 40, e.g., the metallized contacts 160 on the south side of the display screen 40. Each of the four multiplexers 430, 440, 450, 460 has two select lines $s_1$, $s_0$ which determine which of the four inputs will be placed on the output.

The select lines $s_1$, $s_0$ are defined as a function of the orientation of the display screen 40 with respect to the LCD driver 350. Thus, for example, $s_1 s_0$="00" is applied if the display screen 40 has not been rotated with respect to LCD driver 350; $s_1 s_0$="01" is applied if the display screen 40 has been rotated 90 degrees clockwise with respect to the LCD driver 350; $s_1 s_0$="10" is applied if the display screen 40 has been rotated 180 degrees clockwise with respect to the LCD driver 350; and $s_1 s_0$="11" is applied if the display screen 40 has been rotated 270 degrees clockwise with respect to the LCD driver 350.

In operation, if the display screen 40 is not rotated with respect to the LCD driver 350, then 00 is applied on select lines $s_1$, $s_0$ such that the first input of each of the multiplexers 430, 440, 450, 460 is selected. Therefore, pins 2 are coupled to the metallized contacts 160 on the north side of the display screen 40, in this case, pins DP2, DS18 to DS26, BPL2; pins 1 are coupled to the metallized contacts 160 on the east side of the display screen 40, in this case, pins DP1, DS09 through DS17, BPL1; pins 0 are coupled to the metallized contacts 160 on the south side of the display screen 40, in this case, pins DP0, DS0 through DS8, BPL0; and pins 3 are coupled to the west side of the display screen 40, in this case, DP3, DS27 through DS36, BPL3.

If the display screen 40 is rotated 90 degrees clockwise with respect to the LCD driver 350, then 01 is applied on select lines $s_1$, $s_0$ such that the second input of each of the multiplexers 430, 440, 450, 460 is selected. Therefore, pins 3 are coupled to the metallized contacts 160 on the north side of the display screen 40, in this case, DP3, DS27 through DS36, BPL3; pins 2 are coupled to the metallized contacts 160 on the east side of the display screen 40, in this case, pins DP2, DS18 to DS26, BPL2; pins 1 are coupled to the metallized contacts 160 on the south side of the display screen 40, in this case, pins DP1, DS09 through DS17, BPL1; and pins 0 are coupled to the west side of the display screen 40, in this case, pins DP0, DS0 through DS8, BPL0.

If the display screen 40 is rotated 180 degrees with respect to the LCD driver 350, then 10 is applied on select lines $s_1$, $s_0$ such that the third input of each of the multiplexers 430, 440, 450, 460 is selected. Therefore, pins 0 are coupled to the metallized contacts 160 on the north side of the display screen 40, in this case, pins DP0, DS0 through DS8, BPL0; pins 3 are coupled to the metallized contacts 160 on the east side of the display screen 40, in this case, DP3, DS27 through DS36, BPL3; pins 2 are coupled to the metallized contacts 160 on the south side of the display screen 40, in this case, pins DP2, DS18 to DS26, BPL2; and pins 1 are coupled to the west side of the display screen 40, in this case, pins DP1, DS09 through DS17, BPL1.

If the display screen 40 is rotated 270 degrees clockwise with respect to the LCD driver 350, then 11 is applied on select lines $s_1$, $s_0$ such that the fourth input of each of the multiplexers 430, 440, 450, 460 is selected. Therefore, pins 1 are coupled to the metallized contacts 160 on the north side of the display screen 40, in this case, pins DP1, DS09 through DS17, BPL1; pins 0 are coupled to the metallized contacts 160 on the east side of the display screen 40, in this case, pins DP0, DS0 through DS8, BPL0; pins 3 are coupled to the metallized contacts 160 on the south side of the display screen 40, in this case, DP3, DS27 through DS36, BPL3; and pins 2 are coupled to the west side of the display screen 40, in this case, pins DP2, DS18 to DS26, BPL2.

Figure 20:
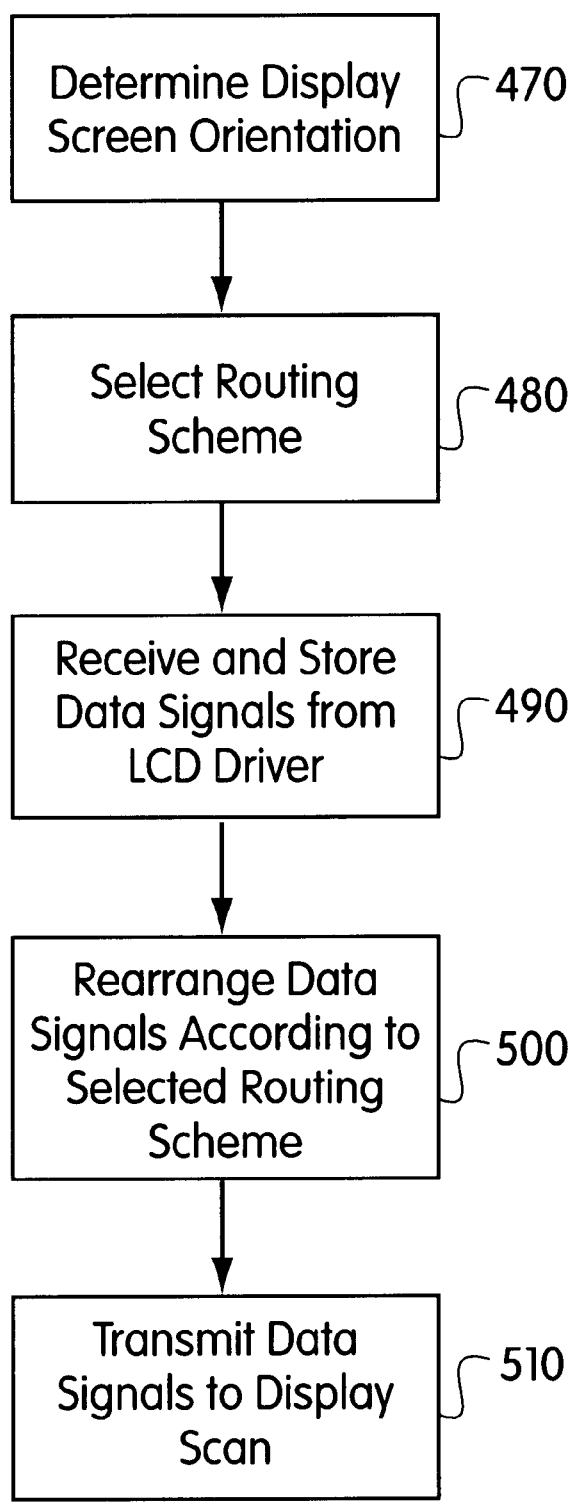
FIG. 20 illustrates a flowchart of an embodiment of a procedure according to the present invention for routing signals from the LCD driver to the display screen.

FIG. 20 illustrates a flowchart of an exemplary embodiment of a procedure according to the present invention for re-routing signals from the pins 0, 1, 2, 3 of the LCD driver 350 to the metallized contacts 160 of the corresponding sides of the display screen 40. The procedure can be applied, for example, as a subroutine in a software program using the microprocessor 200. In step 470, the orientation of the display screen 40 with respect to the LCD driver 350 is determined. Once the orientation of the display screen 40 is determined, based on the orientation of the display screen 40, a routing scheme is selected in step 480. There are, for example, four main routing schemes in the routing arrangement 420 illustrated in FIG. 19. Data signals from pins 0, 1, 2, 3 of the LCD driver 350 are received and stored in a storing arrangement in step 490. In step 500, the data signals are rearranged according to the selected routing scheme of step 480. In step 510, the rearranged data signals are transmitted to the display screen 40. The steps 470 through 510 can be repeated periodically or upon demand from, for example, a user with a computing device.

It is also possible to use software techniques and signal processing to replace, in part or whole, the LCD driver 350.

In the foregoing description, the method and the arrangement of the present invention have been described with reference to specific embodiments. It is to be understood and expected that variations in the principles of the method and the arrangement herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A display arrangment, comprising:
   a circuit board having a driving circuit;
   a hard-wired display for displaying characters, the display having a top portion, the display being removably attached to the circuit board and being rotatable into any of a plurality of orientations with respect to the circuit board;
   a detector for detecting a current orientation of the display with respect to the circuit board; and
   a controller for routing signals to the display from the circuit board based on the detected orientation of the display such that characters displayed on the display maintain a constant orientation with respect to the top portion of the display regardless of the orientation of the display with respect to the circuit board.

2. The display arrangement of claim 1, wherein the circuit board is coupled to a Fieldbus line from which it receives power and data.

3. The display arrangement of claim 2, wherein the circuit board is coupled to field sensing devices via the Fieldbus line.

4. The display arrangement of claim 3, wherein the ciruit board transmits information received from a field sensing device to the display.

5. The display arrangement of claim 1, wherein the controller routes signals without using mathematical operations to convert display coordinates.

6. The display arrangement of claim 1, wherein the display is removably embedded in a surface of the circuit board.

7. The display arrangement of claim 1, wherein the detector and the controller are disposed on the circuit board.

8. The display arrangement of claim 1, wherein the display includes a display screen.

9. The display arrangement of claim 8, wherein the display includes a liquid crystal display (LCD) screen.

10. The display arrangement of claim 1, wherein the display includes a plurality of contacts, with at least two of the contacts being interconnected and forming a short circuit therebetween,
    wherein the detector detects the orientation of the display by determining the location of the short circuit.

11. The display arrangement of claim 10, wherein the at least two interconnected contacts are adjacent to each other.

12. The display arrangement of claim 1, wherein the display includes a plurality of contacts having pads for facilitating an electrical connection between the plurality of contacts of the display and the circuit board.

13. The display arrangement of claim 12, wherein the pads include a plurality of conductive channels to enable the plurality of contacts to electrically connect with the circuit board, each of the conductive channels being at least partially surrounded by an insulating material.

14. The display arrangement of claim 1, wherein the display includes a housing, the housing having a coupling mechanism including a hook, wherein the housing is mounted on the circuit board by engaging the hook and removed by disengaging the hook.

15. The display arrangement of claim 14, wherein when the circuit board is engaged by the hook, the hook latches to at least one of a bottom portion of the circuit board and a recess of the circuit board adapted to cooperate with the hook.

16. The display arrangement of claim 15, wherein the housing includes a plurality of coupling notches and a plurality of decoupling notches which enable an external took to access the coupling mechanism and to force the coupling mechanism to pivot, the external tool accessing the coupling mechanism via a first notch of the coupling notches to engage the hook with the circuit board, the external took accessing the coupling mechanism via a second notch of the decoupling notches to disengage the hook from the circuit board.

17. The display arrangement of claim 1, wherein the driving circuit of the circuit board controls and provides power to the display.

18. The display arrangement of claim 17, wherein the driving circuit includes a microprocessor.

19. The display arrangement of claim 11, wherein the controller includes a multiplexing arrangement having a plurality of inputs, at least one select line, and output lines, the inputs receiving the signals, the at least one select line providing a selection signal corresponding to the detected orientation of the display and determining which input is selected to be provided to the output lines, the output lines being coupled to the display.

20. A display arrangement, comprising:
   a circuit board having a driving circuit;
   a hard-wired display for displaying characters, the display having a top portion, the display being removably attached to the circuit board and being rotatable into any of a plurality of orientations with respect to the circuit board;
   a detector for detecting a current orientation of the display with respect to the circuit board; and
   a controller for routing signals to the display from the circuit board based on the detected orientation of the display such that characters displayed on the display maintain a constant orientation with respect to the top portion of the display regardless of the orientation of the display with respect to the circuit board,
   wherein the circuit board receives power and data along a single wire.

21. The display arrangement of claim 20, wherein the single wire is a FieldBus line.

22. The display arrangement of claim 21, wherein the circuit board is coupled to field sensing devices via the Fieldbus line.

23. The display arrangement of claim 22, wherein the ciruit board transmits information received from a field sensing device to the display.

24. The display arrangement of claim 20, wherein the controller routes signals without using mathematical operations to convert display coordinates.

25. The display arrangement of claim 20, herein the display is removably embedded in a surface of the circuit board.

26. A method for providing an output of a hard-wired display removably attachable and rotatable with respect to a circuit board, the circuit board having a driving circuit, characters displayed on the display having a fixed alignment with respect to a top portion of the display, the method comprising:
   determining an unaligned condition of the display, the display being in a first orientation with respect to the circuit board in the unaligned condition;
   manually rotating the display to a second orientation with respect to the circuit board;
   detecting the second orientation of the display with respect to the circuit board; and
   rerouting signals from the circuit board to the display to display the characters in the fixed alignment with respect to the top portion of the display while the display is in the second orientation with respect to the circuit board.

27. The method of claim 26, wherein the display is manually rotated to restore the top portion of the display to a topmost position.

28. The method of claim 27, wherein the display includes a plurality of contacts, the method further comprising:
   detecting the orientation of the display by determining the location of a short circuit between at least two of the contacts of the display.

29. The method of claim 27, further comprising:
   multiplexing the signals for routing to the display using at least one select line, data on the select line corresponding to the detected orientation of the display.

30. The method of claim 27, further comprising:
   fastening the display to the circuit board using mechanical means.

31. The method of claim 30, wherein the mechanical means include a hook adapted to cooperate with a matching recess in the circuit board.

* * * * *

UNITED STATES PATENT AND TRADEMARK OFFICE
CERTIFICATE OF CORRECTION

PATENT NO.     : 6,433,791 B2
DATED          : August 13, 2002
INVENTOR(S)    : B. Selli et al.

It is certified that error appears in the above-identified patent and that said Letters Patent is hereby corrected as shown below:

<u>Title page,</u>
Item [54], change title "DISPLACEABLE DISPLAY ARRANGEMENT" to
-- DISPLACEABLE DISPLAY --.

Signed and Sealed this

Twenty-fourth Day of June, 2003

JAMES E. ROGAN
*Director of the United States Patent and Trademark Office*